J. S. HALDEMAN.
Lifting-Jacks.
No. 137,363. Patented April 1, 1873.
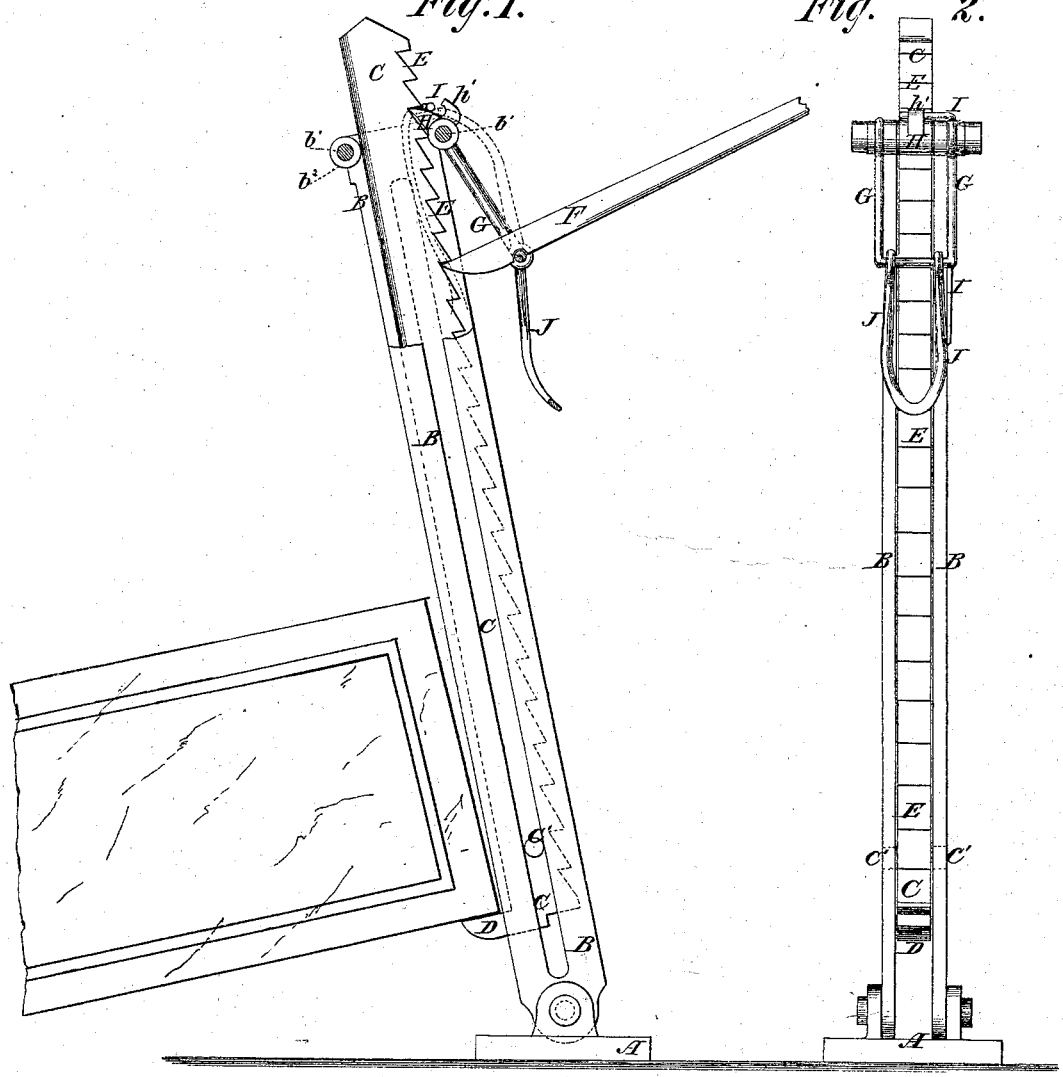
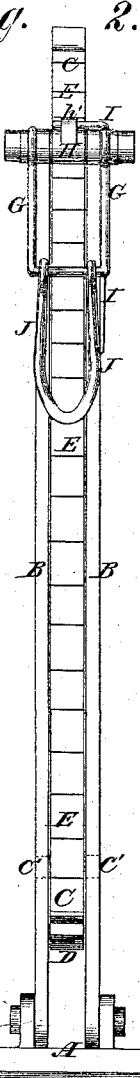
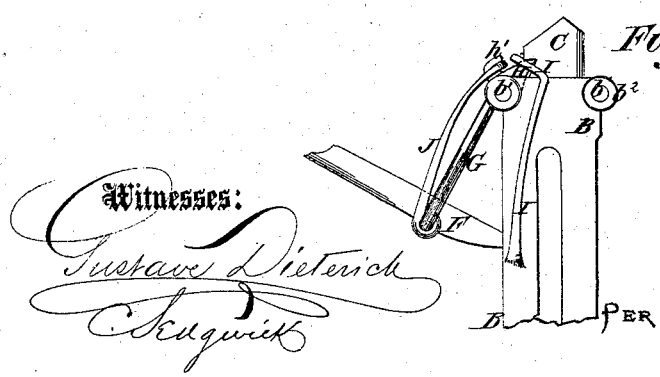
Witnesses:
Gustave Dieterick
C. Sedgwick
Inventor:
J. S. Haldeman
per
Attorneys.

UNITED STATES PATENT OFFICE.

JAMES S. HALDEMAN, OF KANSAS CITY, MISSOURI, ASSIGNOR TO HIMSELF AND HARRY E. CLARK, OF SAME PLACE.

IMPROVEMENT IN LIFTING-JACKS.

Specification forming part of Letters Patent No. 137,363, dated April 1, 1873; application filed October 5, 1872.

*To all whom it may concern:*

Be it known that I, JAMES S. HALDEMAN, of Kansas City, in the county of Jackson and State of Missouri, have invented a new and useful Improvement in Lifting-Jack, of which the following is a specification:

Figure 1 is a side view of my improved lifting-jack, part being broken away to show the construction. Fig. 2 is a rear view of the same, the lever being removed. Fig. 3 is a detail side view of the same illustrating the lowering device.

Similar letters of reference indicate corresponding parts.

My invention has for its object to furnish an improved jack for lifting heavy weights, which shall be simple in construction, convenient in use, and effective in operation, readily adjusting itself to the movement of the end of the heavy body being raised; and it consists in the construction and combination of the various parts, as hereinafter more fully described.

A is the base-plate or foot of the jack, which is made sufficiently large to give a firm support to the jack, and prevent its lower end from being forced into the ground by the weight of the object to be raised. To lugs formed upon the upper side of the foot-plate A are pivoted the lower ends of two bars or plates, B, the upper ends of which are connected and held in proper relative positions by pins $b^1$, which pass through lugs formed upon the edges of said upper ends. The front pin $b^1$ is provided with a roller, $b^2$, to prevent friction as the lifting-bar C is raised and lowered. C is the lifting-bar, which is made of such a size as to fit into the space between the two bars B. The bar C is made of such a length that its upper end may be kept in place by the roller $b^2$ and pins $b^1$. To the lower end of the bar C is attached a cross-pin, $c'$, the ends of which enter and move up and down in longitudinal slots in the said bars B, as shown in Fig. 1. Upon the forward side of the lower end of the lifting-bar C is formed a shoulder or step, D, upon which the object to be raised rests. Upon the other or rear side of the bar C are formed ratchet-teeth E, to receive the end of the operating-lever F to raise the body. The lever F, which may be an ordinary crowbar, or a bar formed expressly for the purpose, is passed through a loop or stirrup, G, pivoted to the rear pin $b^1$ to serve as a fulcrum, and which may be prevented from slipping upon the lever F by entering a notch formed in the under side of the forward end of said lever. H is a pawl, pivoted to the rear pin $b^1$, and which is held forward against the teeth E by a spring, I, attached to one of the bars B, to hold the bar C in place while the lever F is being adjusted for another stroke. Upon the pawl H is formed a projecting hook, $h'$, to serve as a support for holding the loop J, which is pivoted to the loop G when the bar C is to be lowered.

In lowering a weight, the lever F is arranged in the same way as for lifting, and the bar C is raised slightly until the pawl H is raised out of the teeth E. The bar C is then allowed to move down gently the space of one tooth, and so on, the bar C and the supported weight being lowered a tooth at a time.

Having thus described my invention, I claim as new and desire to secure by Letters Patent—

1. An improved lifting-jack, composed of the foot-plate A, pivoted and slotted bars B, toothed bar C provided with a shoulder or step, D, the lever F, pivoted loop or stirrup G, and pawl H, said parts being constructed, arranged and operating substantially as herein shown and described, and for the purposes set forth.

2. The combination of the hook $h'$ and loop J with the pawl H and loop G, substantially as herein shown and described, and for the purpose set forth.

JAMES S. HALDEMAN.

Witnesses:
E. T. MILLS,
BEN. CHOLLAR.